(12) United States Patent
Malachosky et al.

(10) Patent No.: US 9,714,377 B2
(45) Date of Patent: Jul. 25, 2017

(54) MANUFACTURE OF INTERMEDIATE STRENGTH PROPPANT OR LOST CIRCULATION MATERIAL FROM DRILL CUTTINGS

(71) Applicant: Chevron U.S.A. Inc., San Ramon, CA (US)

(72) Inventors: Edward Malachosky, Spring, TX (US); Jonathan Mark Getliff, Aberdeenshire (GB)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 15/068,202

(22) Filed: Mar. 11, 2016

(65) Prior Publication Data

US 2016/0194555 A1 Jul. 7, 2016

Related U.S. Application Data

(63) Continuation of application No. PCT/US2014/055836, filed on Sep. 16, 2014.

(60) Provisional application No. 61/878,398, filed on Sep. 16, 2013.

(51) Int. Cl.
    *C09K 8/80*    (2006.01)
    *E21B 21/06*   (2006.01)
    *E21B 43/267*  (2006.01)

(52) U.S. Cl.
    CPC ............ *C09K 8/80* (2013.01); *C09K 8/805* (2013.01); *E21B 21/066* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 4,793,423 A | 12/1988 | Knol | |
| 7,581,590 B2 | 9/2009 | Lesko et al. | |
| 2007/0119627 A1* | 5/2007 | Reddoch | E21B 21/066 175/66 |
| 2008/0135242 A1* | 6/2008 | Lesko | C09K 8/665 166/268 |

(Continued)

FOREIGN PATENT DOCUMENTS

| | | |
|---|---|---|
| CN | 102807852 | 12/2012 |
| WO | WO 99/48831 | 9/1999 |

OTHER PUBLICATIONS

International Search Report for PCT/2014/055836, mailed Mar. 31, 2015.

*Primary Examiner* — Jeffrey Washville
(74) *Attorney, Agent, or Firm* — King & Spalding LLP (57) ABSTRACT

The present disclosure provides methods and techniques for manufacturing proppant or lost circulation material from drilling cuttings. In an example embodiment, a method for manufacturing proppant or lost circulation material from drilling cuttings includes obtaining solid drilling cuttings from drilling fluid, removing any remaining hydrocarbon from the solid drilling cuttings, and rending the solid drilling cuttings into a powder form. The method further includes using the powdered drilling cuttings as raw material in a proppant or lost circulation material manufacturing process. In an example embodiment, the proppant or lost circulation material manufacturing process can be sintering or flame spheroidization.

18 Claims, 6 Drawing Sheets

(56) References Cited

U.S. PATENT DOCUMENTS

2013/0125586 A1* 5/2013 Koseski .................. C03C 1/002
                                                                                         65/21.3

* cited by examiner

MANUFACTURE OF INTERMEDIATE STRENGTH PROPPANT OR LOST CIRCULATION MATERIAL FROM DRILL CUTTINGS

PRIORITY APPLICATION

The present application claims priority under 35 U.S.C. §111(a) and is a continuation application of PCT Patent Application No. PCT/US14/55836, filed on Sep. 16, 2014, and titled "Manufacture of Intermediate Strength Proppant or Lost Circulation Material From Drill Cuttings," which claims priority to U.S. Provisional Patent Application No. 61/878,398, filed Sep. 16, 2013, and titled "Manufacture of Intermediate Strength Proppant or Lost Circulation Material From Drill Cuttings." The foregoing applications are hereby incorporated herein by reference.

TECHNICAL FIELD

The present application relates to manufacturing proppant or lost circulation material, and in particular, to manufacturing proppant or lost circulation material from drilling cuttings.

BACKGROUND

Hydrofracturing, commonly known as hydraulic fracturing or fracking, is a method of increasing the flow of oil, gas, or other fluids into a well-bore from the surrounding rock formation. Hydrofracturing involves pumping a fracturing liquid into the well-bore under high pressure such that fractures form in the rock formation surrounding the well-bore through which oil and gas can flow into the well-bore and thus, be recovered. However, during recovery, the pressure inside the well-bore, or against the fracture walls, is lower than the pressure applied through the fracturing liquid when forming the fractures. As fractures are formed through high pressure forces rather than through drilling, which involves the removal of mass, fractures are more susceptible to closure due to natural tendency and the forces applied by the surrounding formation.

In order to keep the fractures open during recovery, proppant is placed in the fractures. Proppants are solid particles, commonly ranging from 0.5-2 mm, which are injected into the fractures to prop the fractures open while allowing fluid to flow through its interstitial space. Proppants are commonly mixed into fracturing fluid and injected into the fractures with the fracturing fluid as the fractures are created.

Traditionally, proppants are made from raw materials such as Brady and Ottawa White sands, kaolin, and bauxite. However, due to increasing application of hydrofracturing and thus demand for proppant, the cost of such conventional raw materials is rapidly increasing.

SUMMARY

In general, in one aspect, the disclosure relates to a method of manufacturing proppant from drilling cuttings. The method includes obtaining a plurality of drilling cuttings that have been separated from a drilling fluid, removing hydrocarbon from the plurality of drilling cuttings, pulverizing the plurality of drilling cuttings into a powder, and forming a proppant from the powder.

In another aspect, the disclosure can generally relate to a method of manufacturing proppant. The method includes processing a plurality of drilling cuttings in a cuttings cleaning unit that removes hydrocarbon from the plurality of drilling cuttings, and rendering the drilling cuttings into powdered drilling cuttings. The method further includes forming the powdered drilling cuttings into a plurality of pellets, dropping the plurality of pellets into a flame drop tower, melting the plurality of pellets inside the flame drop tower, producing a plurality of liquefied pellets, and solidifying the plurality of liquefied pellets into a proppant.

In another aspect, the disclosure can generally relate to a method of manufacturing proppant from an argillaceous waste. The method includes crushing the argillaceous waste, removing hydrocarbon from the argillaceous waste to leave a dry argillaceous waste, and forming a proppant from the dry argillaceous waste.

In yet another aspect, the disclosure can generally relate to an encapsulated lost circulation material. The encapsulated lost circulation material includes an enclosed outer layer, wherein the outer layer is crushable or dissolvable, and a volume of powdered drilling cuttings contained within the outer layer.

In yet another aspect, the disclosure relates to a method of manufacturing lost circulation material from drilling cuttings. The method includes obtaining a plurality of drilling cuttings that have been separated from a drilling fluid, removing hydrocarbon from the plurality of drilling cuttings, pulverizing the plurality of drilling cuttings into a powder, and forming lost circulation material from the powder. Those skilled in the art may find other methods to form crushable pellets containing LCM additives.

These and other aspects, objects, features, and embodiments will be apparent from the following description and the appended claims. Those skilled in the art may use the spherical proppant produced by the systems and techniques provided herein for other applications. For example, these particles might be used for bridging material or as cement additives.

BRIEF DESCRIPTION OF THE DRAWINGS

The drawings illustrate only example embodiments of methods and techniques for manufacturing proppant from drilling cuttings and are therefore not to be considered limiting of its scope, as manufacturing proppant from drilling cuttings may admit to other equally effective embodiments. In addition, these methods and techniques may be equally employed to manufacture lost circulation material from drilling cuttings instead of proppant. The elements and features shown in the drawings are not necessarily to scale, emphasis instead being placed upon clearly illustrating the principles of the example embodiments. The methods shown in the drawings illustrate certain steps for carrying out the techniques of this disclosure. However, the methods may include more or less steps than explicitly illustrated in the example embodiments. Two or more of the illustrated step may be combined into one step or performed in an alternate order. Moreover, one or more steps in the illustrated method may be replaced by one or more equivalent steps known in the art to be interchangeable with the illustrated step(s).

DETAILED DESCRIPTION OF EXAMPLE EMBODIMENTS

Example embodiments directed to the manufacturing of proppant from drilling cuttings will now be described in detail with reference to the accompanying figures. In certain exemplary embodiments, lost circulation material can be manufactured from the drilling cuttings using similar techniques. Like, but not necessarily the same or identical, elements in the various figures are denoted by like reference numerals for consistency.

Figure 1:
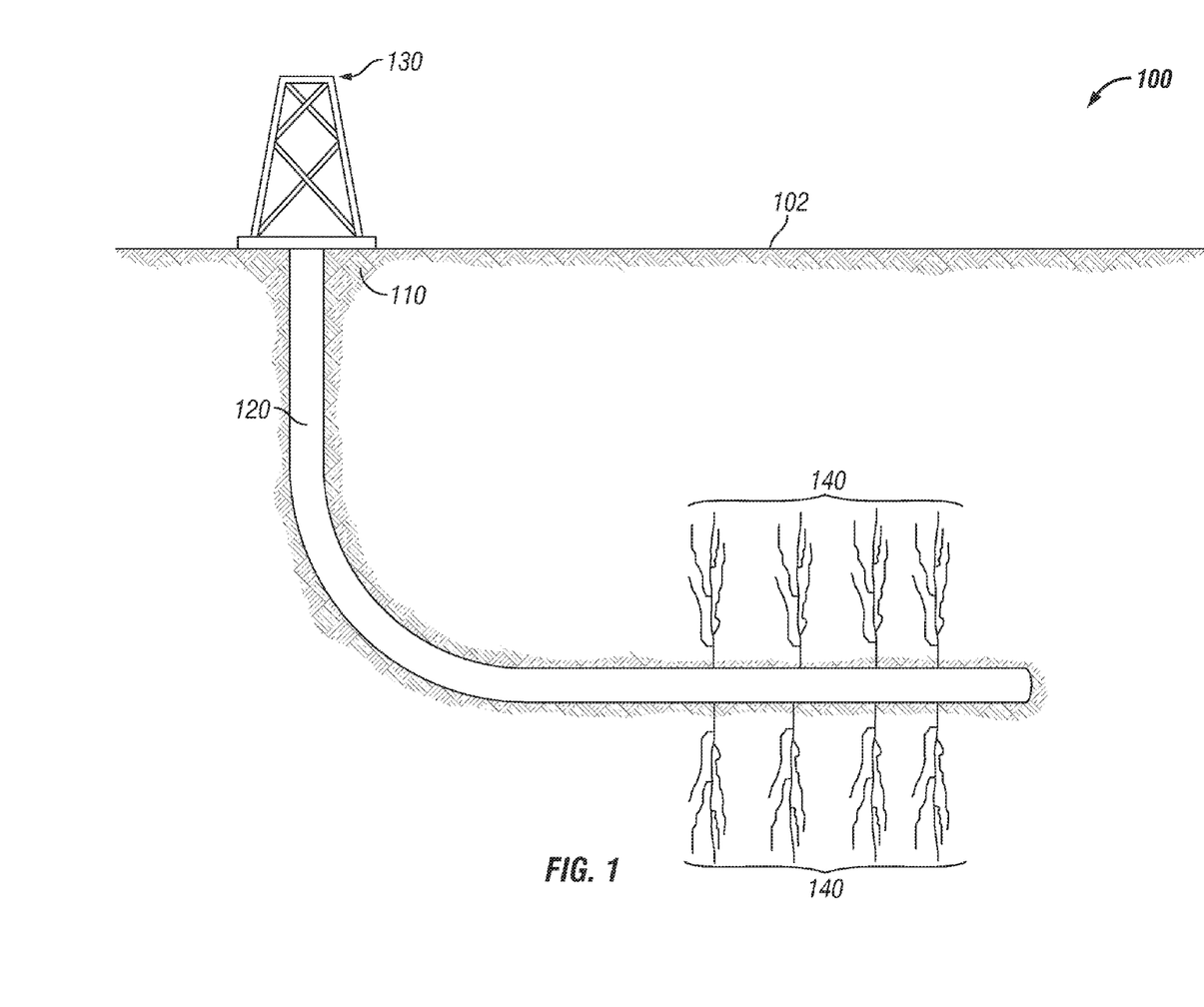
FIG. 1 illustrates a schematic diagram of an oilfield system and well-bore treated with hydrofracturing techniques, in accordance with certain example embodiments.

Drilling cuttings are a typical byproduct of oilfield drilling, or the forming of a wellbore. Referring to FIG. 1, which illustrates an example embodiment of an oilfield system 100 in accordance with an example embodiment, a wellbore 120 is formed in a subterranean formation 110 using field equipment 130 above a surface 102. For on-shore applications, the surface 102 is ground level. For off-shore applications, the surface 102 is the sea floor. The point where the wellbore 120 begins at the surface 102 can be called the entry point. The subterranean formation 110 in which the wellbore 120 is formed includes one or more of a number of formation types, including but not limited to shale, limestone, sandstone, clay, sand, and salt. In certain embodiments, the subterranean formation 110 can also include one or more reservoirs in which one or more resources (e.g., oil, gas, water, steam) can be located. One or more of a number of field operations (e.g., drilling, setting casing, extracting production fluids) can be performed to reach an objective of a user with respect to the subterranean formation 110. During a drill operation, excavated bits of the subterranean formation 110, or drilling cuttings, are flushed out of the wellbore 120 and brought to the surface 102 by drilling fluid.

The example oilfield system 100 of FIG. 1 further includes fractures 140 formed through a hydrofracturing process. In an example hydrofracturing process, a fluid is injected into the wellbore 120 with high enough pressure to create fractures 140 in the surrounding formation 110. Such a process increases the surface area in the formation 110 from which oil and gas can flow. In certain example embodiments, the fluid includes proppants, which are deposited into the fractures and hold the fractures open, allowing oil and gas to flow from the fractures 140 into the wellbore 120 so that it can be recovered.

Conventionally, the drilling cuttings are generally discarded as waste, which adds additional cost, safety issues, and environment risk to the drilling operation. However, the present disclosure provides methods and techniques for rendering drilling cuttings into proppant, a material required for hydrofracturing processes.

Figure 2:
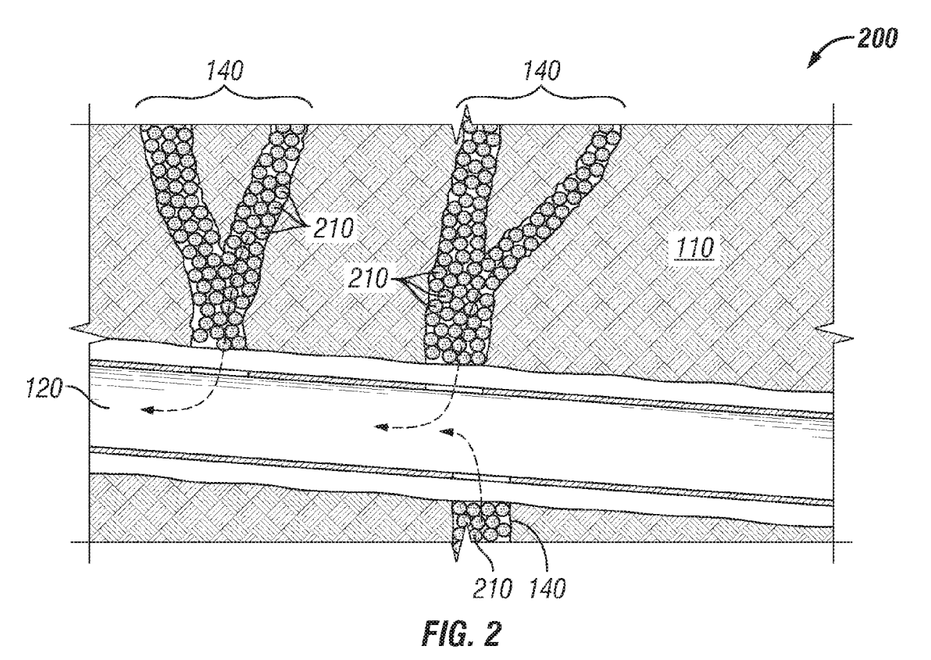
FIG. 2 illustrates a detailed representation of fractures formed in a well-bore through hydrofracturing techniques and filled with proppant, in accordance with certain example embodiments of the present disclosure.

FIG. 2 illustrates a detailed representation 200 of fractures 140 filled with such proppant 210, in accordance with certain example embodiments of the present disclosure. It should be noted that the representation 200 is not to scale and dimensions are exaggerated for illustrative purposes. Referring to FIG. 2, the proppant 210 is disposed within the fractures 140 and support the fracture walls to keep the fracture 140 open. Thus, the proppant 210 must be able to withstand the force applied upon it by the surrounding formation 110. For example, in certain operations, the proppant 210 must be able to withstand approximately 6000 psi or greater. Additionally, the proppant 210, when disposed within a fracture, should provide sufficient interstitial space to allow oil or gas to flow therethrough. The ability of oil and gas to flow through the fracture 140 held open by the proppant 210 is known as the conductivity of the proppant 210. Typically, the larger the particle size of the proppant 210, the better the conductivity. Inversely, the smaller the particle size, the stronger the proppant, or the more pressure it can withstand. Thus, proppant size is selected to provide both acceptable conductivity and strength. However, the specific size to strength ratio of proppant is variable depending on the specific makeup of the proppant 210. Additionally, different formations 110 and wellbore environments may require proppant 210 of different characteristics (e.g., size and strength).

Figure 3:
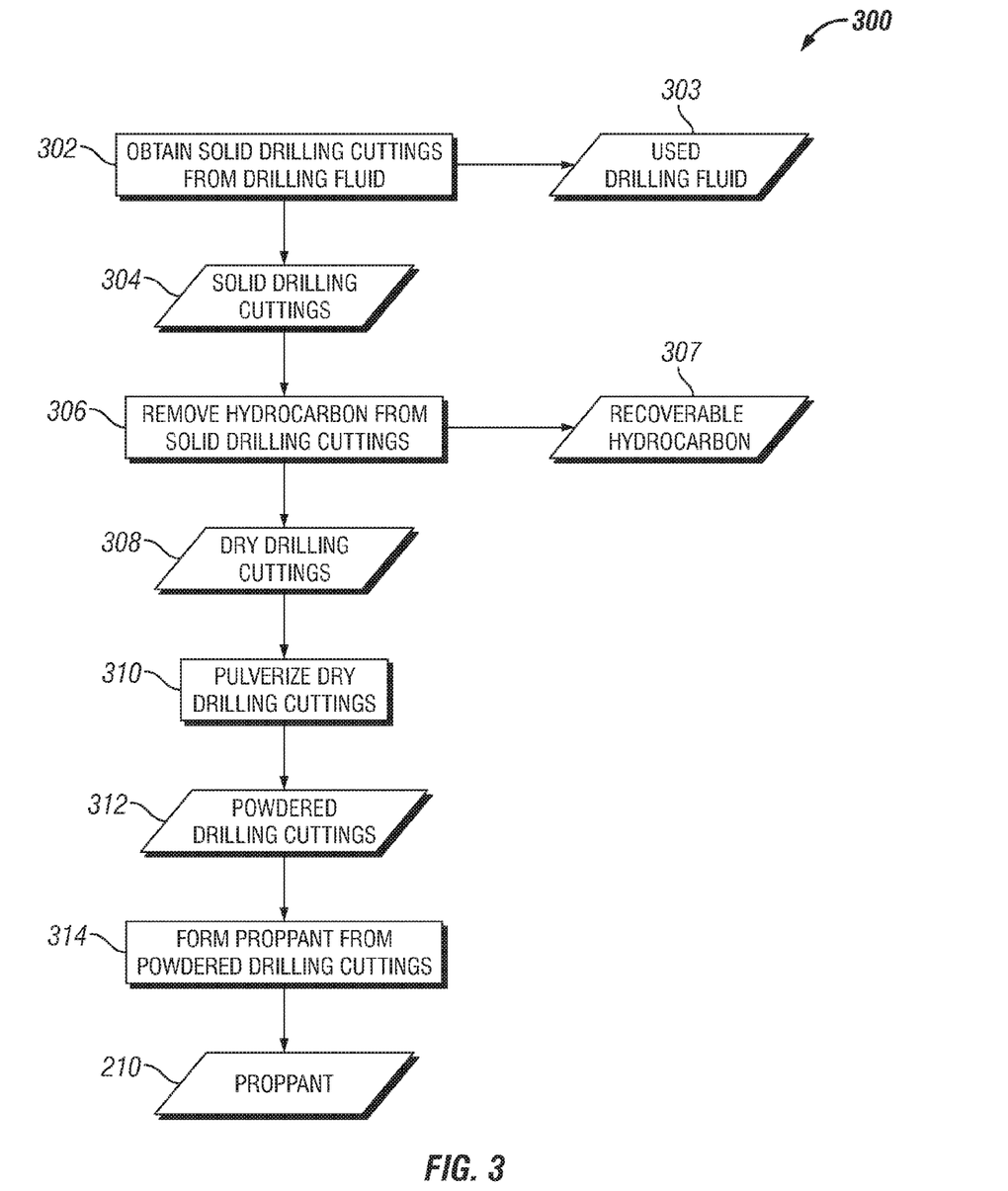
FIG. 3 illustrates a method of manufacturing proppant from drilling cuttings, in accordance with example embodiments of the present disclosure.

FIG. 3 illustrates a method 300 of manufacturing proppant 210 from drilling cuttings, in accordance with example embodiments of the present disclosure. Method 300 and the other example methods described herein can provide a higher strength proppant that is less expensive than proppants made from conventional materials. Referring to FIG. 3, the method 300 includes obtaining solid drilling cuttings 304 from drilling fluid (step 302). As briefly described, drilling cuttings are flushed out of the wellbore 120 with drilling fluid. Thus, in order to render the drilling cuttings useful for proppant 210 manufacturing, the solid drilling cuttings 304 are removed from the drilling fluid. In certain example embodiments, the solid drilling cuttings 304 are removed from the drilling fluid through the use of a rig shaker or other separation process. The solid drilling cuttings 304 as well as the used drilling fluid 303 are thereby separated and respectively obtained. In certain example embodiments, the used drilling fluid 303 is recycled and reused for another drilling process.

The method 300 further includes removing remaining hydrocarbon from the solid cuttings (step 304), thereby obtaining dry cuttings 308. Typically, wet cuttings, or cuttings that still contain hydrocarbon, are unsuitable for proppant manufacturing. In certain example embodiments, a cuttings cleaning unit is integrated with a proppant manufacturing unit to create a continuous process. In certain example embodiments, the remaining hydrocarbon is removed from the solid cuttings 304 through an evaporation process and then collected in a condenser. In certain example embodiments, removal of the remaining hydrocarbon from the solid cuttings 304 results in recoverable hydrocarbon 307, or hydrocarbon that is useful for further oil and gas processes or other processes. When the hydrocarbon has been removed from the solid cuttings 304, dry drilling cuttings 308 are obtained. The method 300 further includes pulverizing the dry cuttings 308 (step 310), which renders the dry cuttings into powdered cuttings 312. Thus, the drilling cuttings are prepared for proppant making. In certain example embodiments, pulverizing the cuttings (step 310) and removing hydrocarbon (step 306) occur in the same step, or substantially simultaneously. Specifically, in certain example embodiments, the hydrocarbon is removed from the solid cuttings 304 while the solid cuttings 304 are being pulverized. In another example embodiment, simply drying the solid cuttings 304 renders the solid cuttings 304 into a pulverized or powder form ready for proppant manufacturing. For example, the solid cuttings 304 can be dried at approximately 600° F. through indirect heat. In one example embodiment, the removal of hydrocarbon and pulverization of the cuttings can be accomplished using known cuttings cleaning and processing techniques.

The method 300 further includes forming the proppant 210 from the powdered cuttings 312 (step 314). In certain example embodiments, proppant 210 is manufactured through one or more proppant manufacturing processes using the powdered cuttings 312 as the raw material, in which the powdered cuttings 312 were obtained through steps 302-312 of this method 300. In certain example embodiments, forming the proppant 210 (step 314) is performed through a sintering process or a flame spheroidization process.

In an example embodiment, the proppant 210 is formed from the powdered drilling cuttings 312 through a sintering process. In such an embodiment, the powdered cuttings 312 are mixed with a binding agent and formed into coherent masses. The coherent masses are then subjected to high temperatures, though the temperature does not need to reach the melting point of the coherent masses in certain example embodiments. Such heating of the coherent mass diffuses the atoms of the powdered cuttings 312, thereby fusing the powder particles of a coherent mass into one solid mass, or an individual proppant particle 210. In other example embodiments, various other steps or additives may be applied to form sintered proppants of certain desired properties.

In another example embodiment, the proppant 210 is formed from the powdered cuttings 312 through a flame spheroidization process, in which the powdered cuttings 312 are mixed with a binding agent to form pellets and then dropped through a flame drop tower. As the pellets travel through the flame drop tower, the pellets are liquefied in mid-air and then solidified into spherical proppants. A method of forming proppants from drilling cuttings through flame spheroidization is described in further detail below with reference to FIGS. 4 and 5. In certain example embodiments, during the sintering or flame spheroidization processes, the powdered drilling cuttings 312 are doped with certain additives or dopants to modify the characteristics of the produced proppant 210. For example, certain drilling cuttings may not be strong enough to produce proppant of a desired strength and are doped with a strengthening additive to increase the strength of the produced proppant 210. In certain example embodiments, the method 300 produces an intermediate strength proppant, or proppant capable of withstanding forces of greater than, or having a crush strength of at least 6000 psi. In certain example embodiments, the produced proppant 210 may have size variation within a batch. Proppant particles can be separated into size classes through sifting or other separation techniques. In certain example embodiments, the method 300 of FIG. 3 is used to produce proppants 210 of varying characteristics using drilling cuttings. In addition to the two example proppant forming techniques described herein, proppant 210 can alternatively be formed through another process besides sintering or flame spheroidization.

Figure 4:
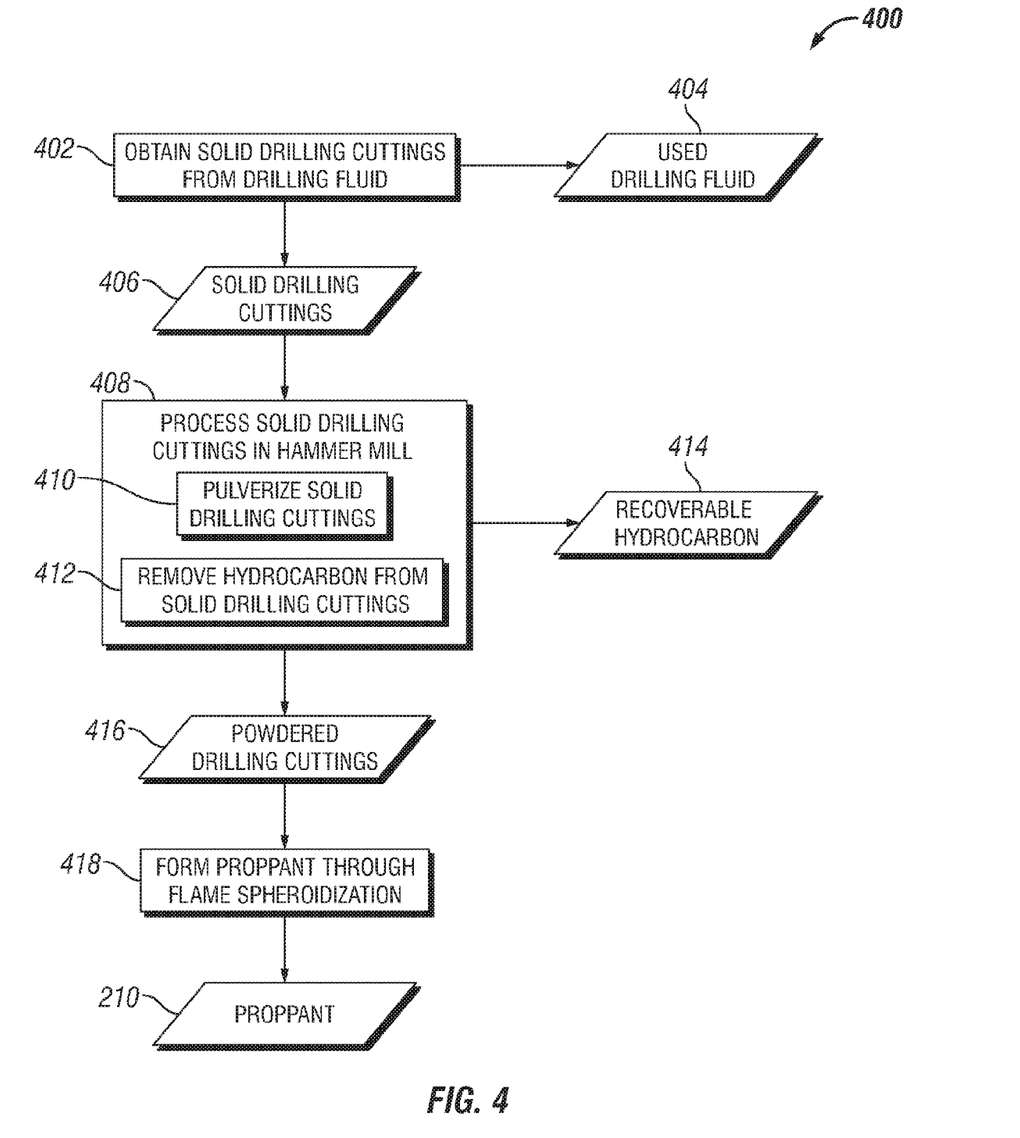
FIG. 4 illustrates an example embodiment of a method of manufacturing proppant from drilling cuttings through flame spheroidization, in accordance with an example embodiment of the present disclosure.

FIG. 4 illustrates an example embodiment of the method 300 of FIG. 3, in accordance with an example embodiment of the present disclosure. Specifically, FIG. 4 illustrates a method 400 of forming proppant 210 using drilling cuttings and a flame spheroidization process. Referring to FIG. 4, the method 400 of manufacturing proppant 210 from drilling cuttings includes obtaining solid cuttings from drilling fluid (step 402), in which solid drilling cuttings 406 and used drilling fluid 404 are separated and respectively collected. In certain example embodiments, the used drilling fluid 404 is recycled and used in a subsequent process. The method 400 further includes processing the solid drilling cuttings 406 in a hammer mill (step 408). In certain example embodiments, the step 408 of processing the solid drilling cuttings 406 in a hammer mill includes pulverizing the solid drilling cuttings 406 (step 410) as well as removing hydrocarbon from the solid drilling cuttings 406 (step 412). In an example embodiment, the hammer mill (not shown) pulverizes the solid drilling cuttings 406 and generates a heated environment. Thus, the hydrocarbon is evaporated from the solid drilling cuttings 406 as the solid drilling cuttings 406 are being pulverized. Accordingly, in such an example embodiment, pulverization of the solid drilling cuttings 406 (step 410) and removal of hydrocarbon from the solid drilling cuttings 406 (step 412) occur substantially simultaneously as the solid drilling cuttings 406 are processed in a hammer mill (step 408). In certain example embodiments, the evaporated hydrocarbon is subsequently collected as recoverable hydrocarbon 414. In other words, the hydrocarbon is not destroyed. Thus, processing the solid drilling cuttings 406 in a hammer mill produces recoverable hydrocarbon 414 as well as powdered drilling cuttings 416. In certain example embodiments, the powdered cuttings 416 are used as raw material in a subsequent step of forming proppant through a flame spheroidization process (step 418). A hammer mill is one example of a machine used to process the solid drilling cuttings. In certain example embodiments, the solid drilling cuttings are processed in either thermal or mechanical cuttings cleaners. In certain example embodiments, the solid drilling cuttings are processed in a grinding or friction based thermal unit.

Figure 5:
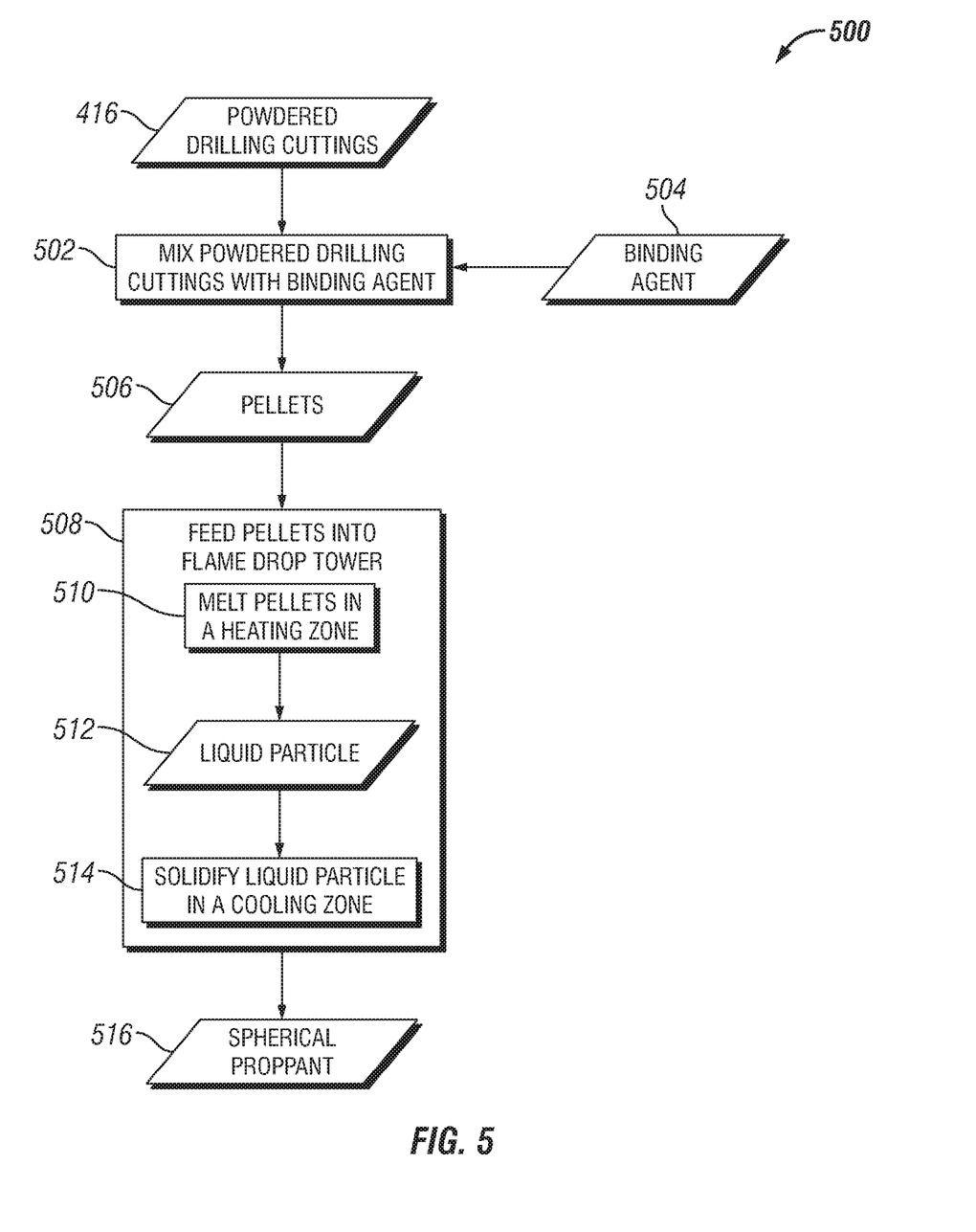
FIG. 5 illustrates an example embodiment of a flame spheroidization process using powdered cuttings as a raw material, in accordance with an example embodiment of the present disclosure.

In certain example embodiments, step 418 of FIG. 4 further includes a method 500 of forming proppant 210 from the powdered cuttings 416 through flame spheroidization. FIG. 5 illustrates the method 500 in accordance with example embodiments of the present disclosure. Referring to FIG. 5, the method 500 of forming proppant from powdered cuttings 416 through flame spheroidization includes using the powdered cuttings 416 as raw material in the process. The method 500 includes mixing the powdered cuttings 416 with a binding agent 504 (step 502). In certain example embodiments, the binding agent 504 includes starch, polyvinyl alcohol, or the like. Thus, individual pellets 506 are formed. The method 500 further includes feeding the pellets 506 into a flame drop tower (step 508). In certain example embodiments, the flame drop tower includes a column through which the pellets 508 are dropped. The column includes a heating zone in the upper portion and a cooler zone at the lower portion. The pellets 506 travel through the heating zone first and then through the cooling zone. In certain example embodiments, once fed into the flame drop tower, the pellets 506 are melted in the hot zone (step 510) inside the flame drop tower. In an example embodiment, the pellets 506 travel through a torch flame, in which the pellets 506 are heated past their melting point. In certain example embodiments, the heating zone is vertically long enough to allow each pellet 506 to stay within the heat zone for a certain period of time as it falls through the tower. Specifically, each pellet should remain within the heat zone for at least as long as the time required for the pellet to melt or liquefy. In certain example embodiments, the period of time ranges from approximately 0.5 seconds to 1.5 seconds.

As the pellets 506 pass through the heating zone, the pellets 506 are melted and rendered into liquid particles 512. The liquid particles 512 are naturally spherical due to surface tension regardless of the previous shape of the pellet 506. Thus, irregularly shaped pellets 506 become substantially spherical liquid particles 512 when melted in the heating zone. The method 500 further includes solidifying the liquid particles 512 in the cooling zone (step 514). The liquid particles 512 travel out of the heating zone and into the cooling zone, in which the liquid particles 512 are cooled and thereby solidified. As the liquid particles 512 are substantially spherical, the liquid particles 512 solidify into substantially spherical solid particles in the cooling zone. Thus, spherical proppant 516 is formed. In certain example embodiments, the spherical proppant 516 is collected in a collection basin at the bottom of the flame drop tower.

It is appreciated that there may be variations on how each step of the methods 300, 400, and 500 is performed, as will be known to one skilled in the art. Additionally, in certain example embodiments, the steps of methods 300, 400, and 500 are interchangeable and/or replaceable with various other steps. Thus, such variations are within the scope of this disclosure. A few example additional embodiments are discussed below, but are not meant to be limiting.

In certain other example embodiments, the solid drilling cuttings 304 are subjected to a grinding process without being dried, or separated from the hydrocarbons, beforehand. For example, in such an embodiment, the solid drilling cuttings 304 are processed using a cuttings dryer or a similar system. Residual hydrocarbons are then later removed during manufacturing of the proppant 210. In one example embodiment, the remaining hydrocarbons are burned off during incineration or melting of the ground cuttings as a part of the flame spheroidization process. This eliminates the need for separate cleaning of the solid drilling cuttings 304 or separate removal of hydrocarbons from the solid drilling cuttings 304, thereby simplifying, and in certain example embodiments, reducing the overall cost or energy requirement for proppant production.

In certain other example embodiments, hydrocarbons are removed from the solid drilling cuttings while simultaneously melting the solid drilling cuttings 304, such as by using a plasma arc and/or via pyrolysis. Additionally, the removed hydrocarbons can be used as a fuel source to power one or more of the processes described herein, thereby reducing external energy requirements. In an example embodiment, the molten drilling cuttings are then pelletized, or formed into proppant 210, through a prilling process in which the molten drilling cuttings are allowed to congeal or freeze in mid-air after being dripped from the top of a prilling or flame drop tower, or as they fall away from a plasma cutter. In certain example embodiments, the molten drilling cuttings are atomized and allowed to form into smaller pellets or prills. Additionally, in certain example embodiments, additional substances are added to the molten drilling cuttings to improve the properties of the produced proppant.

The various techniques and processed described above may be used to produce proppants of different sizes. For example, pulverization of the drilling cuttings using a hammermill can be performed to produce smaller particles, and grinding of the drilling cuttings using a cuttings dryer can be performed to produce larger particles.

Figure 6A:
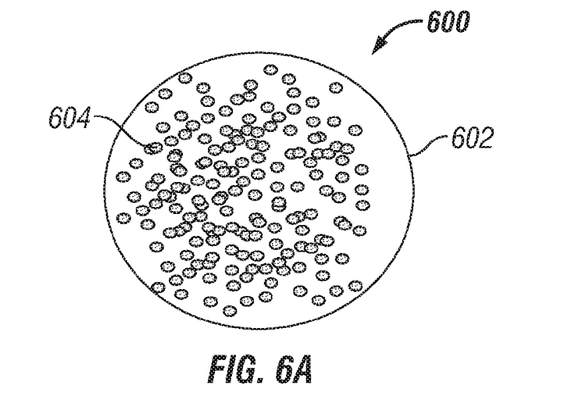
FIGS. 6a-6c illustrate an example embodiment of an encapsulated proppant or lost circulation material, in accordance with an example embodiment of the present disclosure.
Figure 6B:
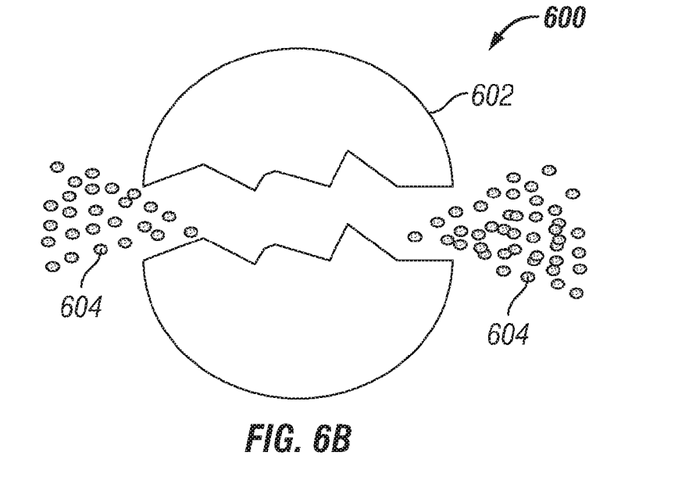
Figure 6C:
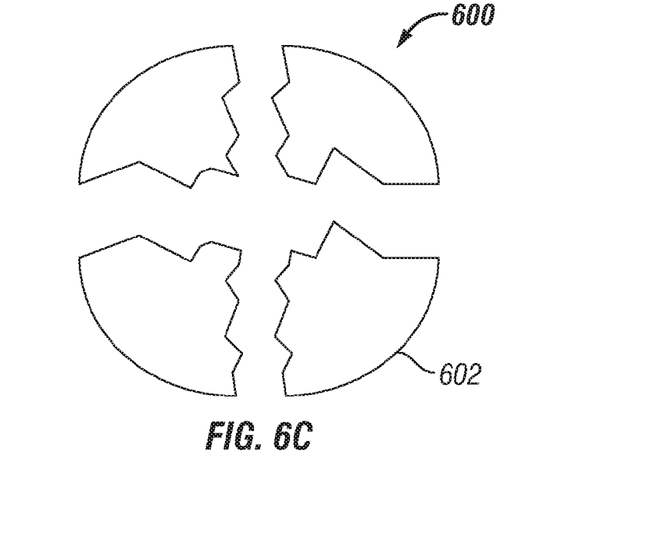

FIGS. 6*a*-6*c* illustrate a crushable encapsulated proppant or lost circulation material 600, in accordance with example embodiments of the present disclosure. Specifically, FIG. 6*a* illustrates an encapsulated proppant or lost circulation material, FIG. 6*b* illustrates a crushed capsule 602, and FIG. 6*c* illustrates a further fragmented capsule 602. In certain example embodiments, dry drilling cuttings 308 (FIG. 3) are powdered and pelletized, then heat treated and/or vitrified to form a crushable outer surface 602 in which the powdered drilling cuttings are contained. In another example embodiment, the crushable outer surface 602 is a crushable or water soluble capsule fabricated from another material. In its uncrushed or undissolved form, the outer surface or capsule 602 contains the powdered drilling cuttings 604 therewithin. As the outer surface or capsule 602 is crushed or dissolved, the powdered drilling cuttings 604 are released and come into contact with neighboring down-hole fluids, such as water, causing the powdered drilling cuttings 604 to swell or thicken. Thus, the powdered drilling cuttings 604 provide a means of sealing fractures and lost circulation zones. In certain example embodiments, the powdered drilling cuttings 604 are mixed with a swelling clay, such as a bentonite type swelling clay, to produce the desired sealing effects. Additionally, in certain example embodiments, the outer surface or capsule 602 is further fragmented into particles, providing bridging particles which help to further plug or seal off lost circulation zones. In certain example embodiments, the methods 300, 400, and 500 are used to manufacture lost circulation material from drilling cuttings instead of proppant.

The present disclosure provides methods and techniques of using drilling cuttings to manufacture proppants. Drilling cuttings are otherwise typically discarded as a drilling byproduct or waste. As drilling cuttings are a common byproduct, and therefore are abundant and generally readily available, large amounts of proppant can be made in a cost effective manner. With increasing demand for proppants, the techniques disclosed herein provide both a cost effective and an environmentally beneficially way of recycling drilling cuttings. Additionally, the particles produced via the techniques disclosure herein can be used for other applications and processes. For example, the particles produced can be used as a lost circulation material or bridging material. Furthermore, the example methods 300, 400 and 500 can also be applied to materials other than drilling cuttings. For example, methods 300, 400 and 500 can be adapted for use with argillaceous waste such as mining tailings.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method of manufacturing proppant from drilling cuttings, comprising:

obtaining a plurality of drilling cuttings that have been separated from a drilling fluid;

removing hydrocarbon from the plurality of drilling cuttings;

pulverizing the plurality of drilling cuttings into a powder, wherein the removing and pulverizing steps are done in a thermo-mechanical cuttings cleaner or a grinding/friction based thermal unit, wherein the thermo-mechanical cuttings cleaner or the grinding/friction based thermal unit removes the hydrocarbon from the plurality of drilling cuttings through evaporation and pulverizes the plurality of drilling cuttings into the powder; and forming a proppant from the powder.

2. The method of manufacturing proppant from drilling cuttings of claim 1, further comprising:

separating the plurality of drilling cuttings from the drilling fluid.

3. The method of manufacturing proppant from drilling cuttings of claim 1, further comprising:

simultaneously removing hydrocarbon from the plurality of drilling cuttings and pulverizing the plurality of drilling cuttings.

4. The method of manufacturing proppant from drilling cuttings of claim 1, wherein removing hydrocarbon from the plurality of drilling cuttings produces recoverable hydrocarbon.

5. The method of manufacturing proppant from drilling cuttings of claim 1, wherein removing hydrocarbon from the plurality of drilling cuttings comprises evaporating hydrocarbon from the plurality of drilling cuttings.

6. The method of manufacturing proppant from drilling cuttings of claim 1, wherein forming the proppant comprises applying a flame spheroidization process to the powder.

7. The method of manufacturing proppant from drilling cuttings of claim 1, wherein forming the proppant comprises applying a sintering process to the powder.

8. The method of manufacturing proppant from drilling cuttings of claim 1, wherein the proppant is an intermediate or higher strength proppant.

9. The method of manufacturing proppant from drilling cuttings of claim 1, further comprising:

removing hydrocarbon from the plurality of drilling cuttings and forming the proppant via vitrification.

10. The method of manufacturing proppant from drilling cuttings of claim 1, further comprising:

separating the proppant into size classes.

11. A method of manufacturing proppant, comprising:

processing a plurality of drilling cuttings in a thermo-mechanical cuttings cleaner or a grinding/friction based thermal unit;

removing hydrocarbon from the plurality of drilling cuttings;

rendering the drilling cuttings into powdered drilling cuttings, wherein the thermo-mechanical cuttings cleaner or the grinding/friction based thermal unit simultaneously evaporates hydrocarbon from the plurality of drilling cuttings and pulverizes the plurality of drilling cuttings;

forming the powdered drilling cuttings into a plurality of pellets;

dropping the plurality of pellets into a flame drop tower;

melting the plurality of pellets inside the flame drop tower, producing a plurality of liquefied pellets; and solidifying the plurality of liquefied pellets into a proppant.

12. The method of manufacturing proppant of claim 11, further comprising:

separating the plurality of drilling cuttings from a drilling fluid.

13. The method of manufacturing proppant of claim 11, wherein removing hydrocarbon from the plurality of drilling cuttings produces a recoverable hydrocarbon.

14. The method of manufacturing proppant of claim 11, further comprising:

mixing the powdered drilling cuttings with a binding agent to form the plurality of pellets.

15. The method of manufacturing proppant of claim 11, wherein the flame drop tower comprises an inner column, the inner column comprising a heating zone in an upper portion and a cooling zone in a lower portion connected to and beneath the heating zone, wherein the plurality of pellets melt as they travel through the heating zone and solidify as they subsequently travel through the cooling zone.

16. The method of manufacturing proppant of claim 11, further comprising:

doping the drilling cuttings or the pellets with an additive to modify one or more characteristics of the proppant.

17. The method of manufacturing proppant of claim 11, wherein the proppant is at least partially rounded.

18. The method of manufacturing proppant of claim 11, further comprising:

separating the proppant into size classes.

\* \* \* \* \*